(12) United States Patent  
Chen (10) Patent No.: US 12,103,492 B2  
(45) Date of Patent: Oct. 1, 2024

(54) REMOTE-CONTROL ACTUATOR

(71) Applicant: TRUSTY CARS LTD., Singapore (SG)

(72) Inventor: Mingtai Chen, Singapore (SG)

(73) Assignee: TRUSTY CARS LTD., Singapore (SG)

( * ) Notice: Subject to any disclaimer, the term of this patent is extended or adjusted under 35 U.S.C. 154(b) by 0 days.

(21) Appl. No.: 18/294,702

(22) PCT Filed: Aug. 6, 2021

(86) PCT No.: PCT/SG2021/050463  
§ 371 (c)(1),  
(2) Date: Feb. 2, 2024

(87) PCT Pub. No.: WO2023/014280  
PCT Pub. Date: Feb. 9, 2023

(65) Prior Publication Data  
US 2024/0270207 A1 Aug. 15, 2024

(51) Int. Cl.  
*B60R 25/20* (2013.01)  
*G07C 9/00* (2020.01)

(52) U.S. Cl.  
CPC .......... *B60R 25/20* (2013.01); *G07C 9/00896* (2013.01); *G07C 2009/00769* (2013.01)

(58) Field of Classification Search  
CPC ...... G07C 9/00896; G07C 2009/00769; G08C 17/02  
See application file for complete search history.

(56) References Cited

U.S. PATENT DOCUMENTS

| | | | |
|---|---|---|---|
| 9,576,414 B2 | 2/2017 | Tieman | |
| 2009/0108989 A1 | 4/2009 | Sinclair | |
| 2018/0320419 A1 | 11/2018 | Haigedegt et al. | |
| 2020/0257330 A1* | 8/2020 | Tieman | G08C 17/02 |

(Continued)

FOREIGN PATENT DOCUMENTS

| | | | |
|---|---|---|---|
| DE | 19854018 A1 | | 5/2000 |
| EP | 1808336 A1 | | 7/2007 |
| JP | 2021095746 A | * | 6/2021 |

OTHER PUBLICATIONS

International Search Report and Written Opinion of International Searching Authority with mailing date of Oct. 25, 2021 for International Application No. PCT/SG2021/050463.

(Continued)

*Primary Examiner* — Nabil H Syed  
(74) *Attorney, Agent, or Firm* — JCIP; Joseph G. Chu (57) ABSTRACT

A remote-control actuator for receiving and actuating a remote-control therein is disclosed. The remote-control actuator includes a controller for receiving at least one data signal and at least one button actuation system. Each button actuation system includes at least one solenoid actuator that is actuatable by the controller when receiving the at least one data signal to extend a plunger thereof. The button actuation system further includes a pin coupled to the plunger of the at least one solenoid for actuating a button of a remote-control. The pin's position is adjustable in a first direction and in a second direction at least substantially orthogonal to the first direction. The remote-control actuator further includes a housing for housing the at least one button actuation system. The housing has a floor and two opposing sidewalls projecting from the floor.

16 Claims, 10 Drawing Sheets

(56) References Cited

U.S. PATENT DOCUMENTS

2021/0092352 A1* 3/2021 Tiwari .................... H04R 1/04
2023/0360834 A1* 11/2023 Yamamoto ............. E05B 19/00

OTHER PUBLICATIONS

International Preliminary Report on Patentability with mailing date of Jul. 11, 2023 for International Application No. PCT/SG2021/050463.

* cited by examiner

REMOTE-CONTROL ACTUATOR

TECHNICAL FIELD

This invention relates to a remote-control actuator. More particularly, this invention relates to a remote-control actuator for actuating remote controls of different designs and dimensions.

BACKGROUND

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Remote controls are used in many applications such as opening and closing of car doors, gates, garage doors, etc. Remote controls used for opening and closing car doors are also known as key fobs. Each key fob has a number of buttons which can be depressed for locking car doors, unlocking car doors, sounding a car alarm, opening a trunk, etc.

Remote controls are usually not shared. Take for example an apartment building with a gate that can be opened or closed using a remote control. The residents living in the apartment building will typically each carry a remote control to be able to go in and out of the apartment block. However, smart phones are ubiquitous these days. A solution is therefore to use the smart phones to operate one single remote control that is placed in a proximity of the gate. To do this, a remote-control actuator that is able to receive wireless command signals from the smart phones or similar devices and actuate corresponding buttons on the remote control is typically employed.

One such remote-control actuator is disclosed in U.S. Pat. No. 9,576,414, Tieman, entitled "Remote Control Button Actuator with Removable Tray." Tieman discloses an actuation system that is used to actuate one or more buttons on a remote control device, such as a key fob of a vehicle, based upon commands generated from a mobile device, such as a smartphone. A controller receives the command signals from the mobile device and converts the command signals into position commands that are used to activate a button actuator to move a plunger into alignment with one of the buttons on the key fob. The button actuator moves the plunger into contact with one of the buttons which generates a corresponding RF signal from the key fob. The button actuator includes a button actuator tip that is configurable to actuate the buttons on a remote control. The button actuator tip can be moved to any position over the surface of the remote control by actuating first and second servo motors operably linked to a boom to control the boom rotation angle and boom extension distance. Once positioned over a remote control button, the button actuator tip, operably linked to a third servo motor, may be lowered to press a remote control button. The servo motors may be controlled by a programmable controller that receives signals from a mobile device via wireless signals. Such a button actuator has a complicated design and is therefore expensive.

Another system which has a simpler design is disclosed in US Patent Application No. 2009/00108989A1, Sinclair, entitled "Personal Access Arrangement for a Vehicle". Sinclair discloses a system to permit access of a motor vehicle (100). The vehicle has a key actuable to enable operation of the vehicle. The system includes a proximity detection arrangement associable with the vehicle and adapted for detection and reading of an electronic tag carried or worn by a driver of the vehicle. A control arrangement is responsive to detection by the proximity detection arrangement of the electronic tag to allow access into the vehicle. In the system, the key is securely mounted upon a plate or substrate. The plate or substrate may be part of a plastic box or like housing which is desirably mounted at a convenient location within the motor vehicle. The key is secured to the substrate using several straps each secured to the substrate using a pair of screws. Also configured upon the substrate is a control and solenoid drive unit. This unit is driven by a detector module. In this fashion, a user of the motor vehicle may approach the motor vehicle whilst wearing the electronic tag and by which the presence of the electronic tag is detected by the detector module. The detector module can thereby output one or more control signals to the control and solenoid drive unit which is operable to interpret the signals received from the tag detector module and to provide drive signals to a pair of micro-solenoids. The micro-solenoids are each positionable above a corresponding one of the buttons of the key. Each of the micro-solenoids is supported by a pivotable rigid support such that a solenoid piston of the corresponding micro-solenoid is normally positioned immediately above the corresponding switch. When an actuation signal is received from the control and solenoid drive unit, the micro-solenoid is able to actuate, extending the piston to contact the button and thereby cause the key to perform the appropriate locking (or unlocking) action, as the case may be. Each of the mounting portions for the corresponding micro-solenoid is able to be pivotally adjusted so that the micro-solenoid can swing away from a position above the corresponding key button. The micro-solenoid can be moved to a non-operative "swing away" position which may be used to provide for in placement, and possible removal, of the key from under the strap restraints. The micro-solenoid should be configured to exert sufficient force upon the corresponding button so as to cause actuation of the button. The supports accordingly must be of sufficient strength so that they may be moved from the pivotal non-operative position into the operative position and yet securely support the micro-solenoid above the key so that sufficient force may be applied downwardly upon the button. Each micro-solenoid can therefore be moved only in a fixed arcuate path. Modifications, such as relocation of the pivotable rigid support, is likely required if a different key is used.

There is therefore a need for a remote-control actuator which addresses, at least in part, one or more of the forgoing problems.

SUMMARY

According to an aspect of the present disclosure, there is provided a remote-control actuator for receiving and actuating a remote-control therein. The remote-control actuator includes a controller for receiving at least one data signal and at least one button actuation system. Each button actuation system includes at least one solenoid actuator that is actuatable by the controller when receiving the at least one data signal to extend a plunger thereof. The button actuation system further includes a pin coupled to the plunger of the at least one solenoid for actuating a button of a remote-control. The pin's position is adjustable in a first direction and in a second direction at least substantially orthogonal to the first direction. The remote-control actuator further includes a housing for housing the at least one button actuation system. The housing has a floor and two opposing sidewalls projecting from the floor.

In some embodiments, the at least one button actuation system further includes a block fixedly attached to the plunger, the block including a groove along which the pin is slideable in the first direction.

In some embodiments, the at least one solenoid actuator's position is adjustable in the second direction to allow the block's and the pin's position to be adjusted in the second direction.

In some embodiments, the first direction is a horizontal direction with respect to the floor of the housing and the second direction is a vertical direction with respect to the floor of the housing.

In some embodiments, the at least one button actuation system further includes a column projecting from the floor. The longitudinal axis in the second direction. The button actuation system further includes a support that is slidable up and down the column for supporting the at least one solenoid actuator.

In some embodiments, the at least one solenoid actuator includes two solenoid actuators supported on the support on opposing sides of the column. The two plungers of the solenoid actuators fixedly attached to respective end portions of the block.

In some embodiments, the at least one button actuation system includes two button actuation system located side-by-side in the housing.

In some embodiments, each sidewall of the housing has an opening to allow access from outside of the housing for manually moving the support of each button actuation system up and down a respective column thereof.

In some embodiments, the remote-control actuator further includes a tray receiving portion for receiving a tray on which the remote-control is supported. The receiving portion is able to receive the tray in a plurality of positions to cater to remote control of different designs and dimensions so that a button thereon remains at least substantially a predetermined distance from the pin to be thereby actuatable.

In some embodiments, the tray receiving portion includes spaced apart projections on each side wall defining a plurality of channels in the second direction for receiving the tray vertically with respect to the floor.

In some embodiments, the spaced apart projections on each side wall further defines a plurality of channels in the first direction for receiving the tray horizontally with respect to the floor.

In some embodiments, the remote-control actuator according to Claim 11, further includes a bi-fold cover having a first cover panel hinged to a second cover panel. The first cover panel is for covering a top opening defined in the housing for accessing the tray receiving portion and the second cover panel is for covering a side opening defined in the housing for accessing the tray receiving portion. The side opening adjoins the top opening.

In some embodiments, the remote-control actuator further includes a lock fixedly mounted to the second cover panel. The lock has an engagement receiver.

The remote-control actuator further includes an engagement member pivotably coupled to the floor of the housing. The engagement receiver receives the engagement receiver to thereby lock the second cover panel to the floor.

In some embodiments, the at least one data signal comprises a wireless data signal.

In some embodiments, the wireless data signal is one of a Bluetooth, a Bluetooth Low Energy (BLE), a Zigbee, a Wi-fi, and a Short Messaging Service (SMS) data signal.

In some embodiments, the remote-control actuator further includes a receiving chamber defined in the housing for receiving a battery pack for powering the at least one solenoid actuator and an ejector that is actuatable to eject the battery pack from the receiving chamber.

Other aspects and advantages of the invention will become apparent from the following detailed description, taken in conjunction with the accompanying drawings, illustrating by way of example the principles of the invention.

BRIEF DESCRIPTION OF DRAWINGS

The invention will be better understood with reference to the drawings, in which.

DETAILED DESCRIPTION OF THE EMBODIMENTS

Throughout this document, unless otherwise indicated to the contrary, the terms "comprising", "consisting of", "having" and the like, are to be construed as non-exhaustive, or in other words, as meaning "including, but not limited to."

Furthermore, throughout the specification, unless the context requires otherwise, the word "include" or variations such as "includes" or "including" will be understood to imply the inclusion of a stated integer or group of integers but not the exclusion of any other integer or group of integers.

Throughout the description, it is to be appreciated that the term 'controller' and its plural form include microcontrollers, microprocessors, programmable integrated circuit chips such as application specific integrated circuit chip (ASIC), computer servers, electronic devices, and/or combination thereof capable of processing one or more input electronic signals to produce one or more output electronic signals. The controller includes one or more input modules and one or more output modules for processing of electronic signals.

Unless defined otherwise, all technical and scientific terms used herein have the same meaning as is commonly understood by a skilled person to which the subject matter herein belongs.

Figure 1:
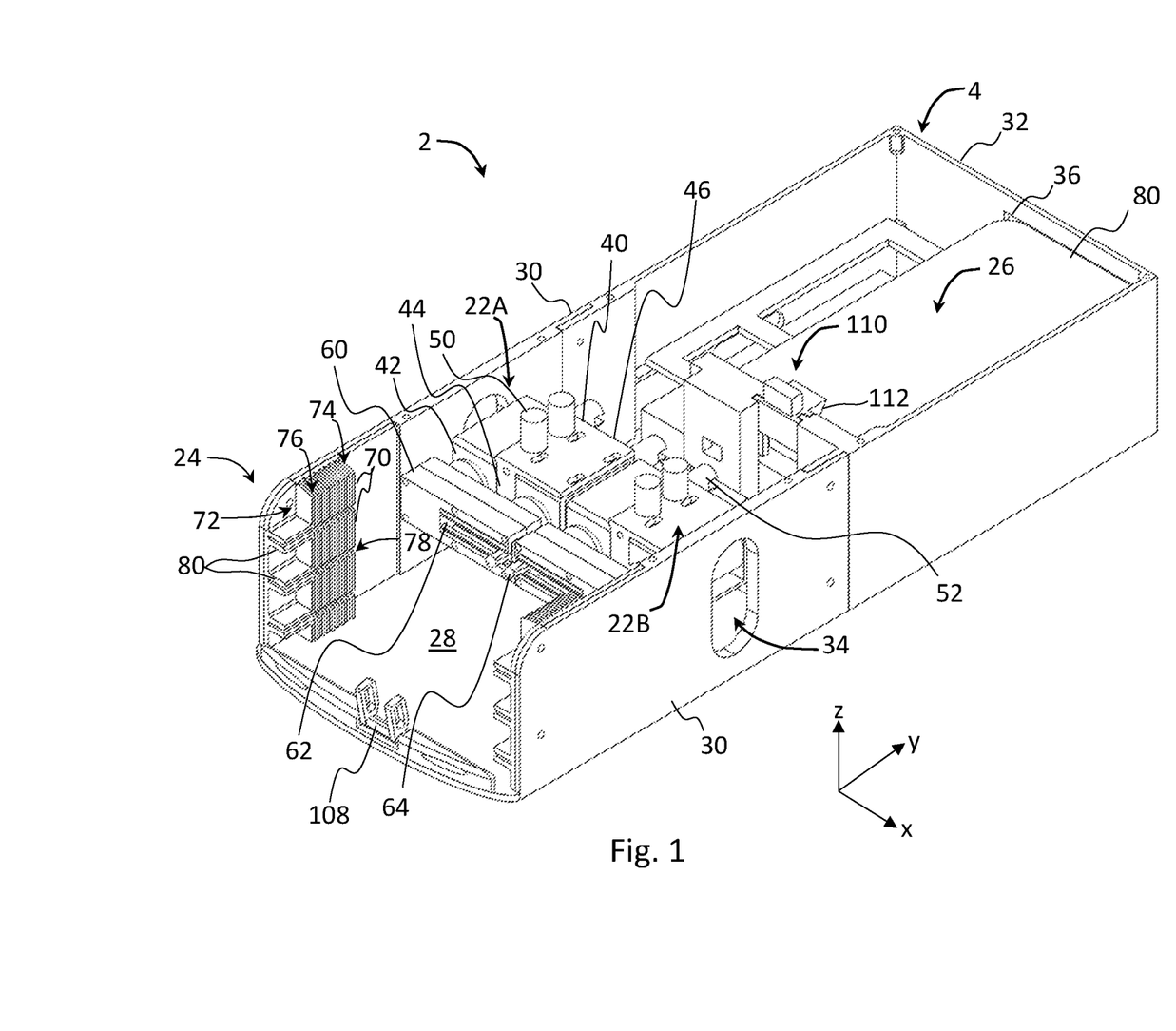
FIG. 1 is an isometric drawing of a remote-control actuator according to an embodiment of the invention with a cover removed.
Figure 2:
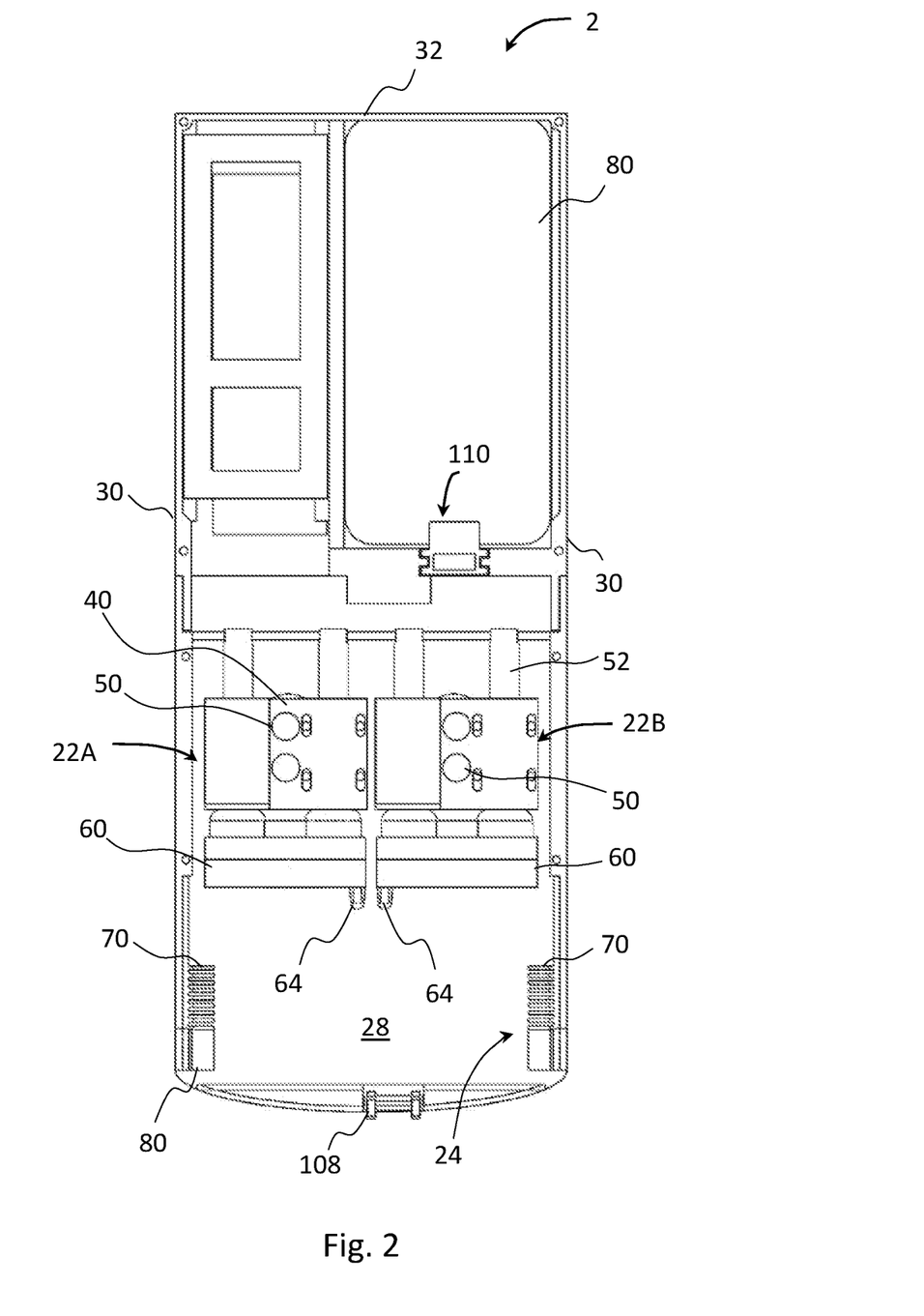
FIG. 2 is a plan view of the remote-control actuator in FIG. 1.

As shown in the drawings for purposes of illustration, the invention may be embodied in a novel remote-control actuator suitable for use with remote controls of different designs and dimensions. Existing remote-control actuators tend to be complicated to make, use and modify. Referring to FIGS. 1 and 2, a remote-control actuator for receiving and actuating a remote control therein embodying the invention generally includes a controller for receiving at least one data signal, and at least one button actuation system. Each button actuation system includes one or more solenoid actuators, each of which is actuatable by the controller when receiving the at least one data signal to extend a plunger thereof. The button actuation system further includes a pin coupled to the plunger of the solenoid actuator for actuating a button of a remote-control. The pin's position is adjustable in a first direction and in a second direction at least substantially orthogonal to the first direction. The remote-control actuator further includes a housing for housing the at least one button actuation system. The housing has a floor and two lateral opposing sidewalls projecting from the floor.

Figure 4:
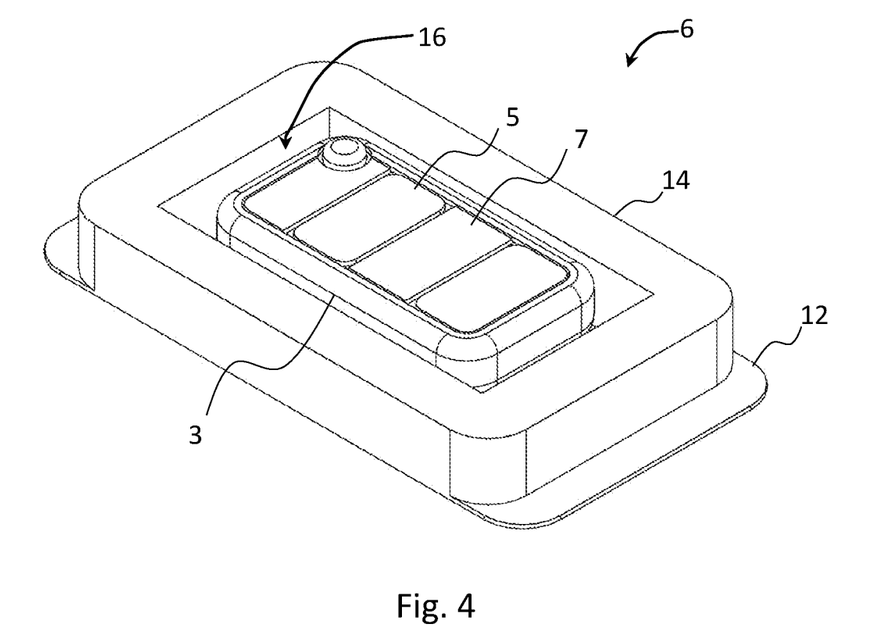
FIG. 4 is an isometric drawing of a tray for supporting a remote control that is receivable into the remote-control actuator in FIG. 1.
Figure 6:
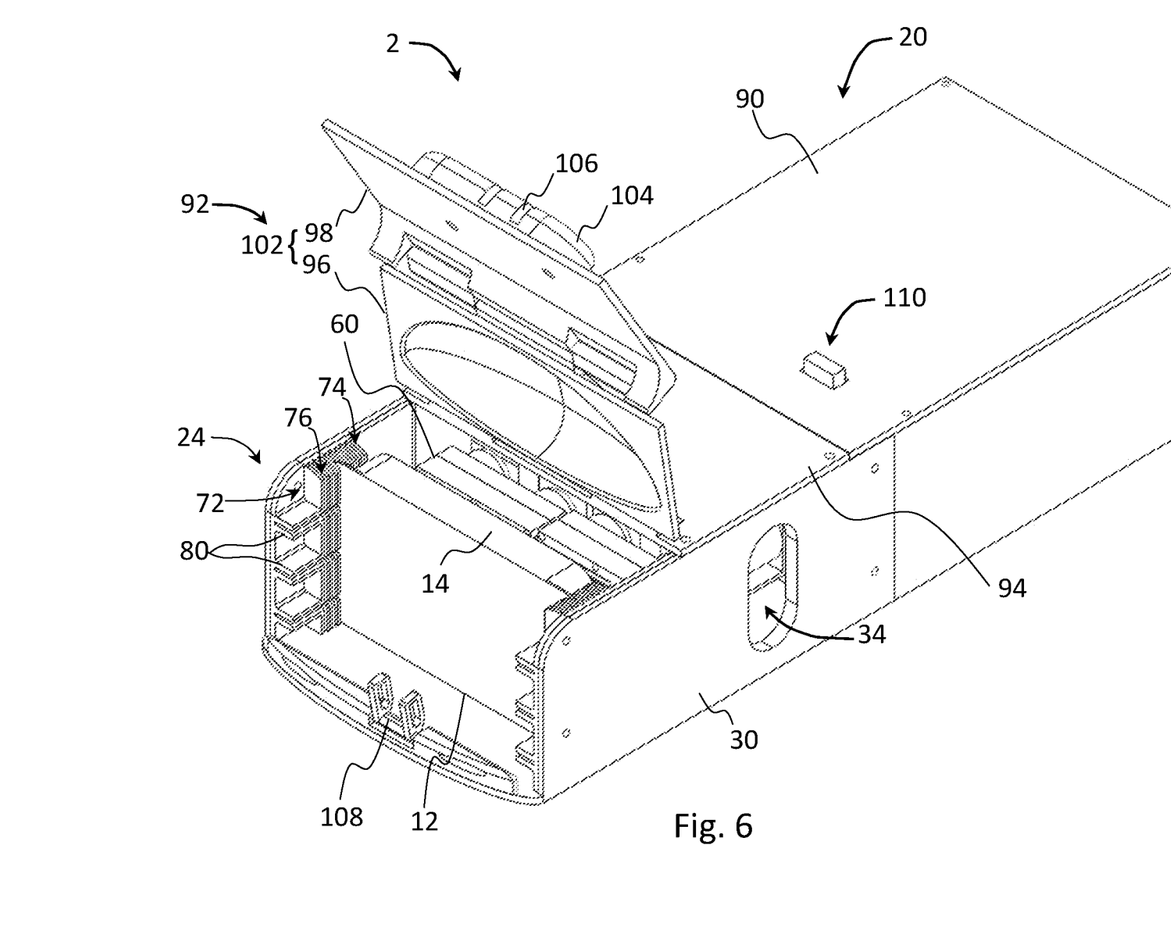
FIG. 6 is an isometric drawing of the remote-control actuator in FIG. 5 with the tray received therein.

Specifically, FIGS. 1 and 2 show the above remote-control actuator 2 for actuating a remote-control, such as a key fob 3 (FIG. 4), that is received therein. The remote-control actuator 2 includes a housing 4 that defines an interior for receiving a removable key fob tray 6 (FIGS. 4 and 6). The key fob tray 6 is sized to receive a key fob 3 that includes one or more buttons 5, 7 that can be individually depressed to send wireless command signals to a vehicle, e.g. a car (not shown). As an example, the buttons 5, 7 can be pressed to lock the car doors, unlock the car doors, start the engine, open the trunk, send a panic signal, turn on headlamps or perform other functions depending upon the configuration of the key fob 1006. Although one specific configuration of a key fob 3 is shown in FIG. 4, it should be understood that various other configurations of the key fob 3 are contemplated as being within the scope of the present disclosure. These key fobs may be of different designs and/or dimensions having a different number of buttons.

FIG. 4 shows the tray 6. The tray 6 includes a base 12 and a ring wall 14 defining a cavity 16 therein. The key fob 3 is received in the cavity 16 to be positioned on the base 12 of the tray 6 with the buttons 5, 7 facing outwards. The key fob 3 may be securely held in place on the tray 6 using for example double-sided sticky tape (not shown) and/or precision-cut hard foam mould in the cavity 16 to provide confining pressure and lateral movement constraints.

FIG. 1 is an illustration of the remote-control actuator 2 with a cover 20 (FIGS. 6 and 7) of the housing 4 removed to illustrate the various components contained within the housing 4. Included within the interior are two button actuation systems 22A, 22B, a tray receiving portion 24, a controller (not shown) and a battery receiving chamber 26. The housing 4 includes a floor 28, two lateral opposing sidewalls 30 and a rear sidewall 32 between the ends of the two lateral sidewalls 30. Each of the lateral sidewalls 30 has a respective oval-shape opening 34 therethrough. The rear sidewall 32 has a rectangular-shape opening 36 leading into the battery receiving chamber 26 in the housing 4.

The controller is able to receive one or more wireless data signals associated with actuation of the buttons 5, 7 of the key fob 3. Accordingly, the wireless data signals may include wireless data signals for instructing the remote-control actuator 2 to lock the car doors, unlock the car doors, start the engine, open the trunk, send a panic signal, turn on headlamps, etc. In the embodiment shown in FIG. 1 with two button actuation systems 22A, 22B, only two buttons 5, 7 of the key fob 3 are actuatable. Those skill in the art would recognize that key fobs can have from two to as many as eight buttons in any type of layout and orientation on up to three surface planes of the remote control. The key fobs also come in a variety of package sizes and designs. Some are without a mechanical key blade while others come with fixed or movable mechanical key blades. The remote-control actuator 2 shown in FIG. 1 can be configured to actuate any two buttons of any of these key fobs.

Any known wireless communication protocols may be used to send the wireless data signals to the remote-control actuator 2. These wireless communication protocols include, but are not limited to, Bluetooth, Bluetooth Low Energy (BLE), Zigbee, Wi-fi, and Short Messaging Service (SMS) protocols. The use of SMS would extend the range of operation of the remote-control actuator 2 as compared to the other short range wireless communication protocols. In this manner, smart phones can be used to send SMS messages to the remote-control actuator 2 to control its operation. As an example, the controller may be configured to receive a first SMS message including a first predefined alpha-numeric message to unlock the car doors and a second SMS message including a second predefined alpha-numeric message to lock the car doors. When receiving an SMS message, the controller compares the alpha-numeric message therein with predefined messages stored thereon. Only when there is a match will the controller actuate a corresponding button 5, 7 of the key fob 3.

Figure 3A:
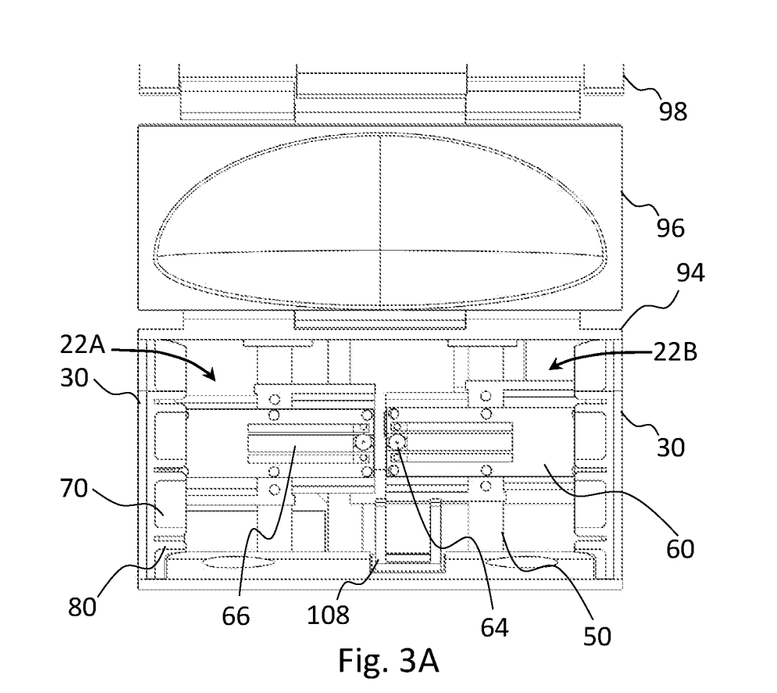
FIGS. 3A, 3B, and 3C are side views of the remote-control actuator in FIG. 1, showing a pair of pins moveable into different vertical positions.
Figure 3B:
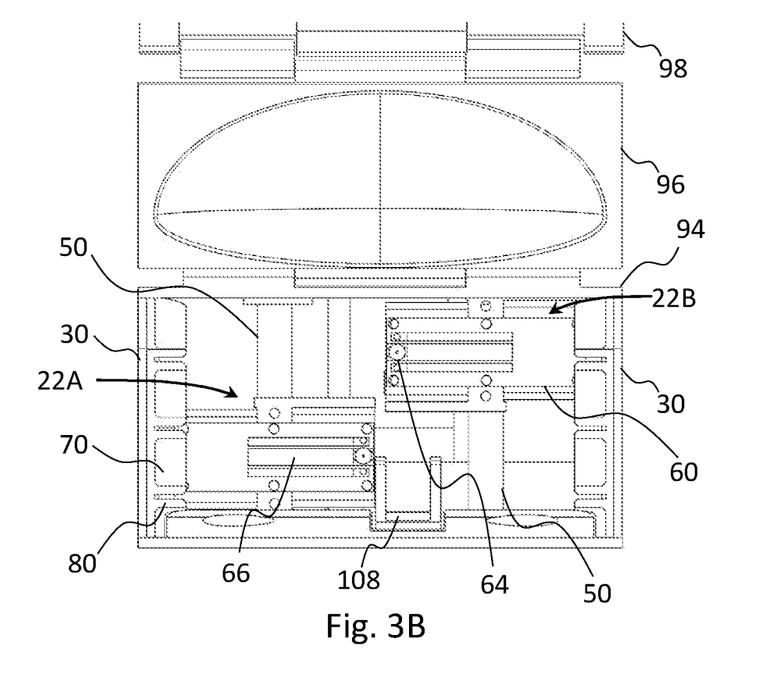
Figure 3C:
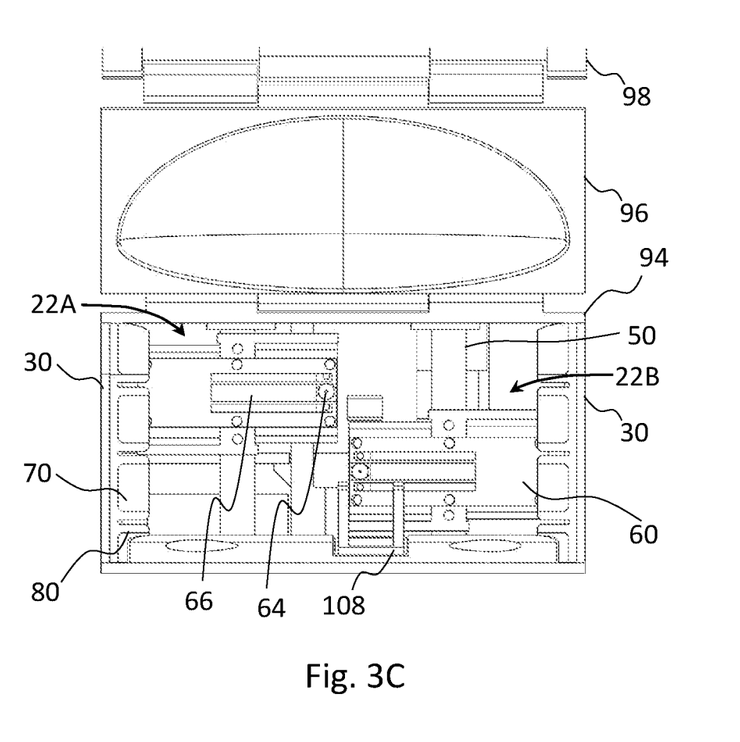
Figure 8A:
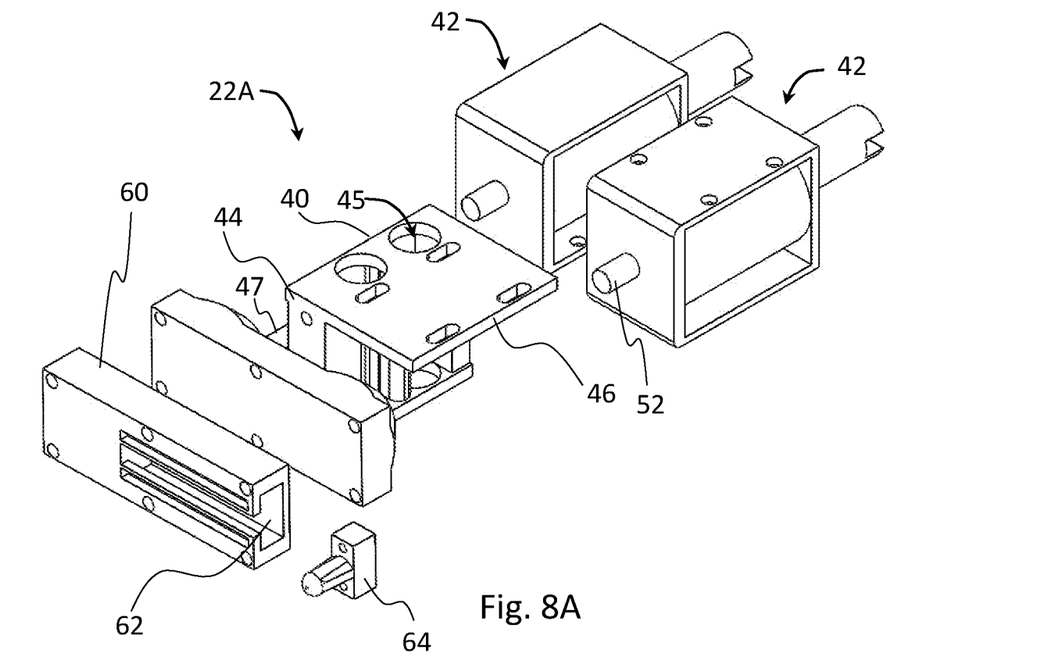
FIGS. 8A and 8B are exploded isometric drawings of button actuation systems of the remote-control actuator of FIG. 1.
Figure 8B:
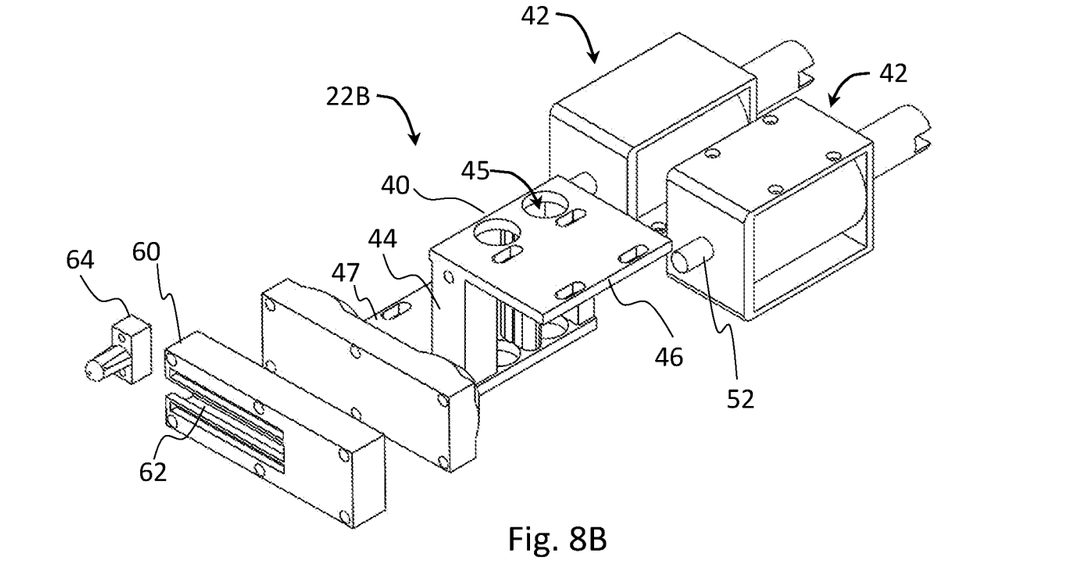

The button actuation system 22A, 22B is next described in detail with the FIGS. 8A and 8B. Each button actuation system 22A, 22B includes a support 40 for supporting a pair of solenoid actuators 42. The support 40 includes a medial portion 44 having two holes 45 therethrough. Extending from one side of the medial portion 44 is a top plate 46. Extending from the other side of the medial portion 44 is a bottom plate 47. A solenoid actuator 24 is securely mounted to each of the top plate 46 and the bottom plate 47 to be on each side of the support 40. Each button actuation system 22A, 22B further includes a pair of cylindrical columns 50 fixedly mounted to the floor 28 of the housing 4 to be projecting in an upward z direction. The support 40 is mounted on the two columns 50 with the two columns 50 going through the two holes 45 in the support 40. In other words, each column 50 has a longitudinal axis in the z direction. The support 40 and therefore the solenoid actuators 42 supported thereby are slideable up and down the two columns 50 in the z direction. FIGS. 3A-3C show the supports 40 of the two button actuation systems 22A, 22B moved to different positions along length of the respective columns 50. The two columns 50 also prevent the rotation of the support 40 about the columns 50. Each solenoid actuator 42 is a push-type solenoid actuator 42 with a plunger 52 that is retracted via spring action when the solenoid actuator 42 is not energized and that is extended when the solenoid actuator 42 is energized. Each button actuation system 22A, 22B further includes a block 60 having end portions which are coupled to the two plungers 52 of the pair of solenoid actuators 42. The end portions define cavities (not shown) in a rear surface thereof that receive respective ends of the plungers 52 to be fixedly attached thereto. The block 60 includes a groove 62 that runs in the x direction in a front surface thereof. The groove 62 has a T-shape cross section. Each button actuation system 22A, 22B further includes a pylon-shape pin 64 that is slideable along the groove 62 so that its position can be adjusted to anywhere along the groove 62. When the button actuation system 22A, 22B is mounted to the floor 28 of the housing 4, the pin 64 is therefore slideable along the groove 62 in a horizontal direction with respect to the floor 28 of the housing 4. And with the support 40 slideable up and down the two columns 50, the pin 64 is thus also moveable in a vertical direction with respect to the floor 28 of the housing 4. That is, the pin 64 is moveable in two directions (x and z directions) that are at least substantially orthogonal to each other. A path of the pin 64 is therefore not fixed. The pin 64 can therefore be moved to any point on a plane to be aligned with a button 5, 7 of the key fob 3 held in the installed tray 6 (FIG. 6).

In this embodiment of the remote-control actuator 2, the two button actuation systems 22A, 22B, including a first button actuation system 22A and a second button actuation system 22B, are located side-by-side in the housing 4 with openings to the grooves 62 at the sides of the two blocks 60 facing each other. The first button actuation system 22A may be actuated to actuate a unlock-doors button 5 of the key fob 3 and the second button actuation system 22B may be actuated to actuate a lock-doors button 7 of the key fob 3. The button actuation systems 22A, 22B are mounted in the housing 4 such that the solenoid actuators 42 mounted to the supports 40 are accessible from outside of the housing 4 via the openings 34 in the sidewalls 30 for a user to manually move the support 40 up and down the respective columns 50.

Next the tray receiving portion 24 in the housing 4 is described in detail with the aid of FIGS. 1 and 6. The tray receiving portion 24 is able to receive the tray 6 in one of several positions to cater to key fobs of different designs and/or dimensions so that the buttons thereon remain at least substantially a predetermined distance from the pins 64 of the button actuation systems 22A, 22B to be thereby actuatable. Alternatively, the position of the tray 6 may be adjusted according to a stroke vs force profile of the solenoid actuators 42. The tray receiving portion 24 includes spaced apart vertically disposed panels 70 that are arranged in rows 72 and columns 74. For example, the tray receiving portion 24 includes four rows 72 of panels 70 and ten columns 74 of panels 70. Each row 72 therefore includes ten horizontally aligned panels 70 and each column 74 includes four vertically aligned panels 70. The columns 74 of panels 70 define channels 76 in the z direction for receiving the base 12 of the tray 6 so that the tray 6 is vertically disposed with respect to the floor 28 of the housing 4. The z direction channels 76 are equal distance apart. The rows 72 of panels 70 define channels 78 in the y direction for receiving the base 12 of the tray 6 so that the tray is horizontally disposed with respect to the floor 28 of the housing 4. This arrangement is suitable for key fobs with buttons on a side face thereof. The tray receiving portion 24 further includes horizontally disposed panels 80 flanking the opening of the y direction channels 78 to extend a length thereof. It should be appreciated that with such key fobs held in a horizontally disposed tray, one or more openings (not shown) in the ring wall 14 of the tray is necessary for the pins 64 to come into contact with the buttons of the key fob. Although it is described that panels 70 are used to define the channels 76, 78, the channels 76, 78 may also be defined using any type of projections from the sidewalls 30. These projections may additionally define channels (not shown) that are transverse to the floor 28 of the housing 4.

During use, when the controller receives the wireless data signal for unlocking doors, it actuates the pair of solenoid actuators 42 of the first button actuation system 22A. This is done via closing a relay 43 (FIG. 9) so that the pair of solenoid actuators 42 are energized by a battery pack 80 received in the battery receiving chamber 26. When the solenoid actuators 42 are actuated, the plungers 52 thereof are urged towards their extended position in the y direction. The block 60 connected to the plungers 52 therefore also travel in the y direction. In this manner, the pin 64 mounted thereon whose position has been adjusted to be aligned to the unlock-doors button 5 of the key fob 3 is able to come into contact and press against that button to actuate it. Similarly, when the controller receives the wireless data signal for locking doors, it is able to actuate the second button actuation system 22B to thereby actuate the lock-doors button 7 of the key fob 3.

Figure 5:
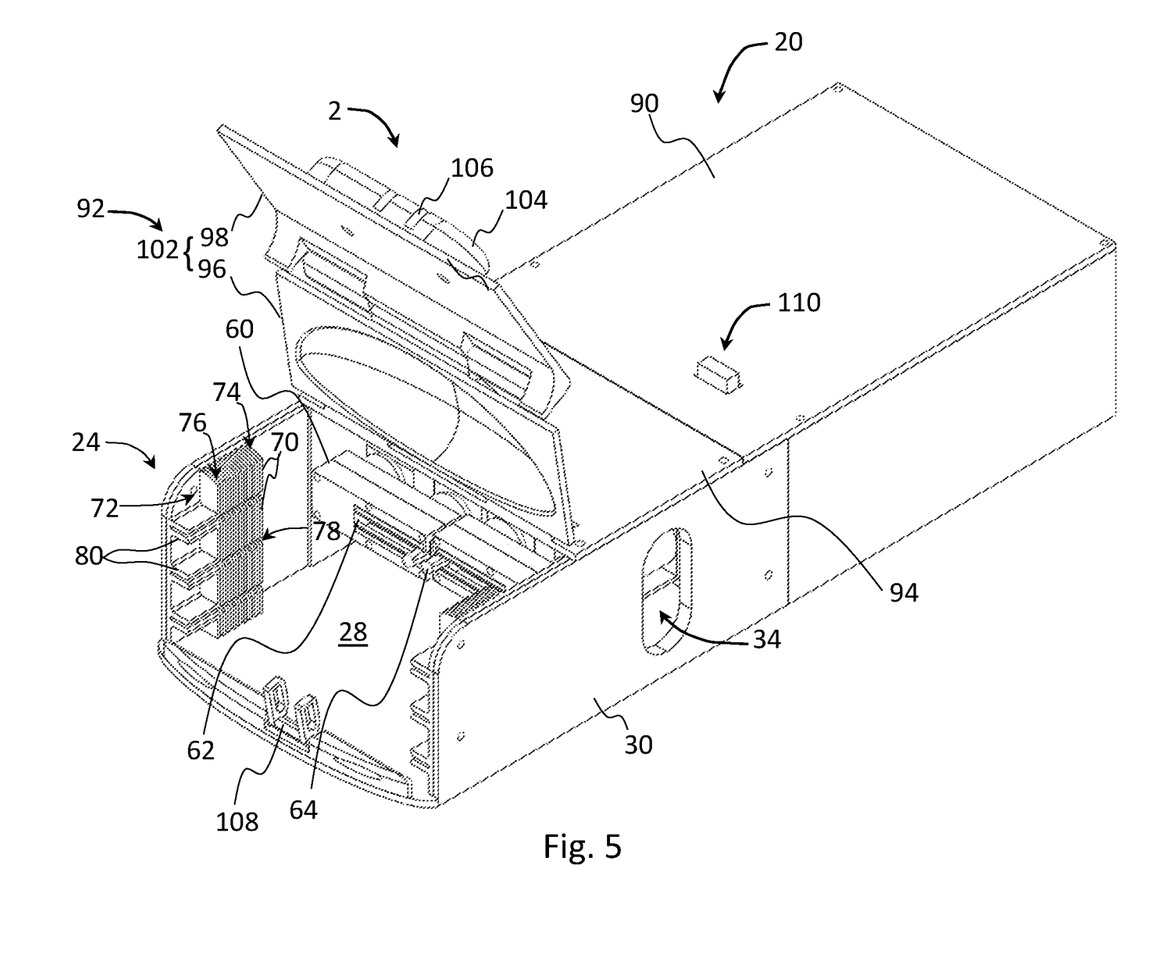
FIG. 5 is an isometric drawing of the remote-control actuator in FIG. 1 with the cover attached and a bi-fold cover portion thereof in an open position ready for receiving the tray in FIG. 4.
Figure 7:
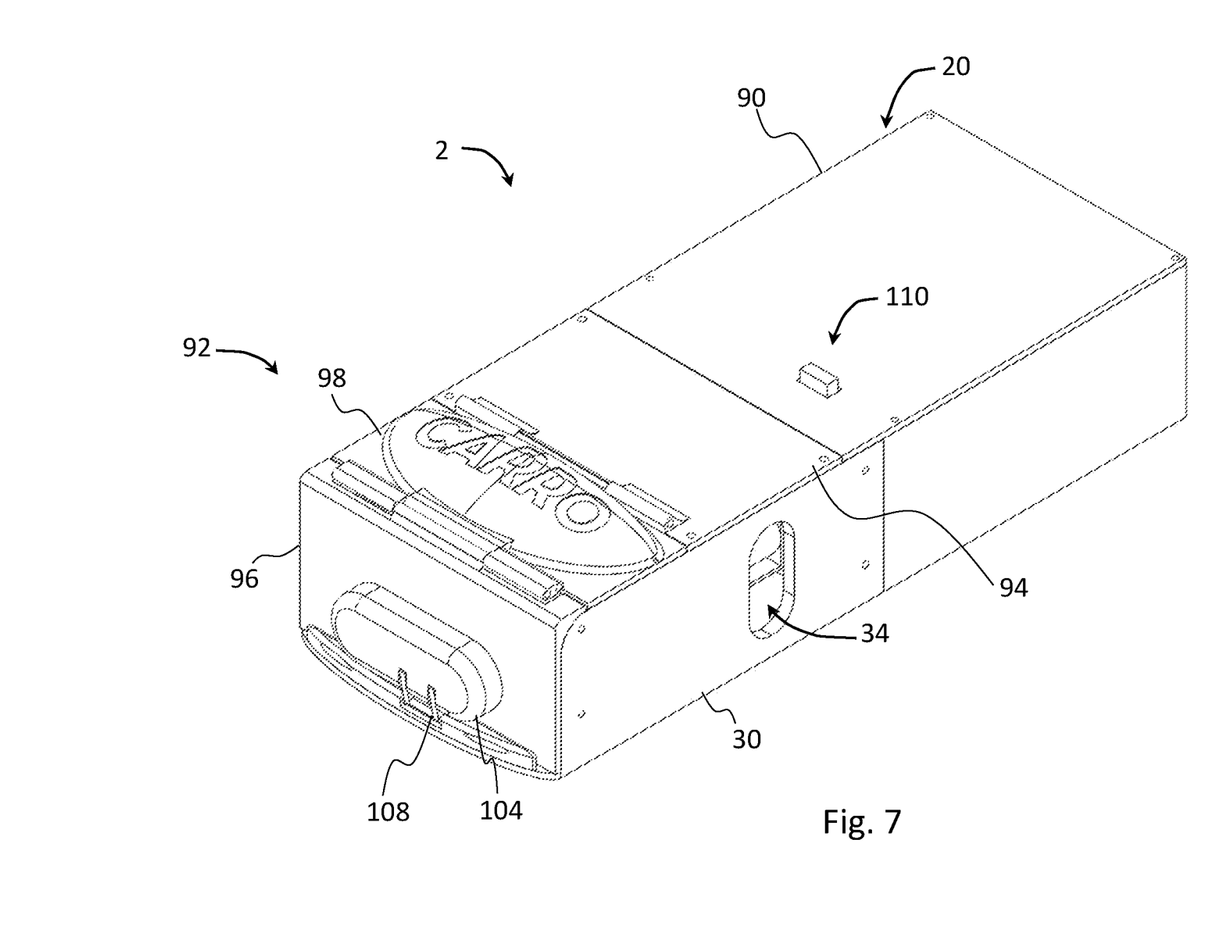
FIG. 7 is an isometric drawing of the remote-control actuator in FIG. 6 shown with the bi-fold cover portion in a close position.

The housing 4 of the remote-control actuator 2 further includes a cover 20 as shown in FIGS. 5-7. The cover 20 includes a first cover section 90 and a second cover section 92. The first cover section 90 is fixedly attached to the battery receiving chamber end of the housing 4. The second cover section 92 includes a first cover panel 94, a second cover panel 96 and a third cover panel 98. The second cover panel 96 is pivotably connected to the first cover panel 94. And the third cover panel 98 is pivotably connected to the second cover panel 96. Like the first cover section 90, the first cover panel 94 of the second cover section 92 is fixedly attached to the top of the housing abutting the first cover section 90. This allows the second cover panel 96 to be tiltable between a close position over the tray receiving portion 24 and an open position away from and exposing the tray receiving portion 24 as shown in FIGS. 5 and 6 to allow a user to insert and remove the tray 6 vertically. In the close position of the second cover panel 96, the third cover panel 98 is also tiltable between a close position to cover a side opening 100 of the housing 4 as shown in FIG. 7 and an open position away from the side opening 100 to allow the user to insert and remove the tray 6 horizontally. The second cover panel 96 and the third cover panel 96 define a bi-fold cover 102.

Optionally, the remote-control actuator 2 may include a lock 104 for locking the third cover panel 98 to the floor 28 of the housing 4. The lock 104 may be a numerical lock 104 commonly found on suitcases. The numerical lock 104 may be fixed to the third cover panel 98. The numerical lock 104 has an engagement receiver 106. Pivotably attached to the floor 28 is an engagement member 108. The engagement member 108 is received in the engagement receiver 106 to be locked therein.

Figure 9:
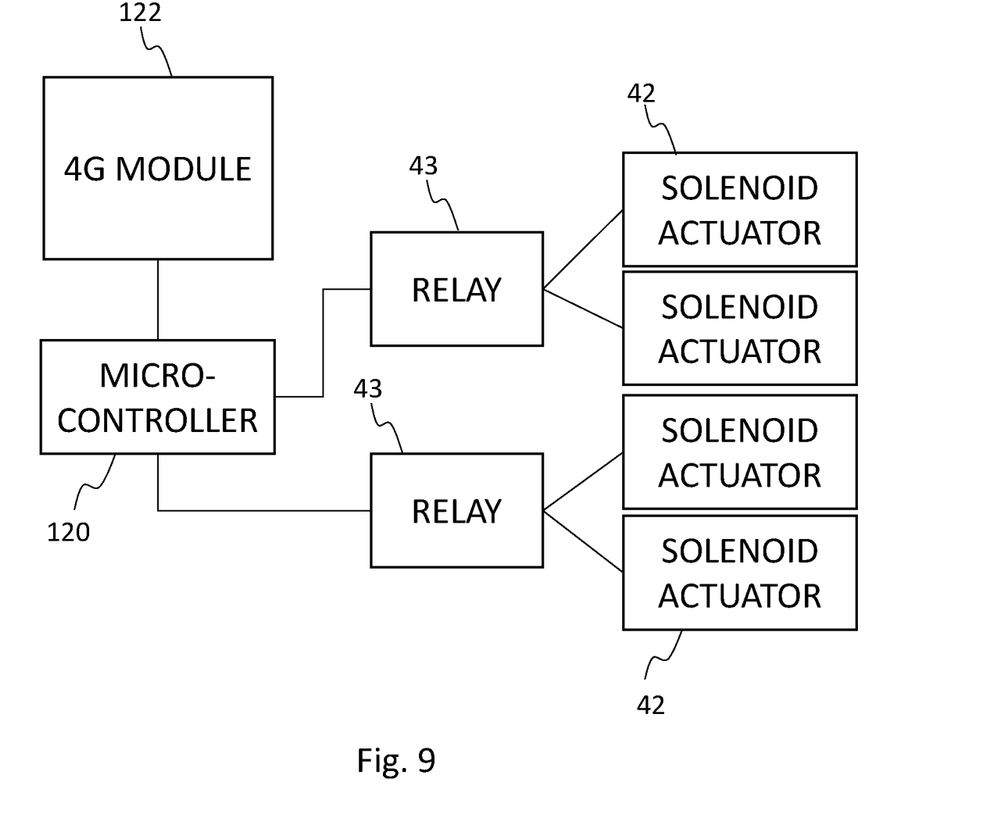
FIG. 9 is a block diagram showing electronic and electrical components of a the remote-control actuator of FIG. 1.

As mentioned above, the housing 4 includes the battery receiving chamber 26 for receiving a battery pack 80. The battery pack 80 may be inserted through the opening 36 in the end wall 32 into the housing 4 to be received in the battery receiving chamber 26 to be connected via a connector (not shown) to the relays 43 and solenoid actuators 42. The battery pack 80 may be any battery pack including, but not limited to, a lithium polymer battery pack. However, it is contemplated that the solenoid actuators 42 may also receive power from a 12-volt DC power source, such as a vehicle battery. FIG. 9 shows the electronic and electrical components of the remote-control actuator 2. The controller includes a microcontroller 120, such as but not limited to, an ESP32 microcontroller available from Expressif Systems, a company based in Shanghai, China. The controller further includes a 4G module 122, such as but not limited to, a SIM7600E from SIMCom Wireless Solutions Limited. The 4G module 122 is connected to the microcontroller 120. The microcontroller 120 and the 4G module 122 are powered by a 5V battery (not shown), such as a Universal Serial Bus (USB) power bank. To conserve battery power, the microcontroller 120 is put in a sleep/standby mode. When the 4G module receives the above-described SMS, the 4G module 122 will interrupt the microcontroller 120 to bring the microcontroller out of the sleep/standby mode to obtain the alpha-numeric message from the 4G module 122. The microcontroller 120 is further connected to the relays 43 to actuate them to in turn actuate the solenoid actuators 42.

The housing 4 may further include an ejector 110 that is actuatable to engage and eject the battery pack 80 such that an end of the battery pack 80 juts out of the opening 36 in the end wall 32 to facilitate its removal. The ejector 110 is biased upwards by a spring (not shown) and can be pressed such that an inclined surface 112 (FIG. 1) thereof urges against the battery pack 80 to push it outwards. A top of the ejector 110 is exposed on the first cover section 90.

Advantageously, the above-described remote-control actuator 2 is of a simple singular design. It has wireless connectivity with mobile devices for actuating a single remote control stored therein. It may simply be used as a standalone device located within a vehicle without any modification to the vehicle's electronic, electrical or mechanical system. The remote-control actuator 2 can also cater to remote controls of different designs and/or dimensions without requiring any modification.

Although the present invention is described as implemented in the above described embodiment, it is not to be construed to be limited as such. For example, the support 40 is described as being supported to be slidable on two columns 50. Embodiments of the invention may include just a single column 50 of any suitable cross-sectional shape that prevents the support 40 from being rotatable thereabout.

As another example, the button actuation system 22A, 22B is described to include two solenoid actuators 42. In some embodiments, especially where the block 60 is narrow in width, one solenoid actuator 42 may suffice.

As yet a further example, the button actuation systems 22A, 22b are described to be located side-by-side. In some other embodiments, the two button actuation systems may be located one on top of the other.

As another example, the remote-control actuator 2 is also described as being used to actuate a key fob. It should not be construed to be so limited. The remote-control actuator 2 may be used to receive and actuate any type or remote-controls, including but not limited to, remote controls for opening and closing gates, remote controls for electronic appliances, such as air-conditioners, fans, lights, etc.

It should be further appreciated by the person skilled in the art that one or more of the above modifications or improvements, not being mutually exclusive, may be further combined to form yet further embodiments of the present invention.

The invention claimed is:

1. A remote-control actuator for receiving and actuating a remote-control therein, the remote-control actuator comprising:
    a controller for receiving at least one data signal;
    at least one button actuation system, each button actuation system comprising:
        at least one solenoid actuator that is actuatable by the controller when receiving the at least one data signal to extend a plunger thereof; and
        a pin coupled to the plunger of the at least one solenoid for actuating a button of a remote-control;
        wherein the pin's position is adjustable in a first direction and in a second direction at least substantially orthogonal to the first direction; and
    a housing for housing the at least one button actuation system, the housing having a floor and two opposing sidewalls projecting from the floor.

2. The remote-control actuator according to claim 1, wherein the at least one button actuation system further comprises a block fixedly attached to the plunger, the block including a groove along which the pin is slideable in the first direction.

3. The remote-control actuator according to claim 2, wherein the at least one solenoid actuator's position is adjustable in the second direction to allow the block's and the pin's position to be adjusted in the second direction.

4. The remote-control actuator according to claim 3, wherein the first direction is a horizontal direction with respect to the floor of the housing and the second direction is a vertical direction with respect to the floor of the housing.

5. The remote-control actuator according to claim 4, wherein the at least one button actuation system further comprises:
    a column projecting from the floor, the column having a longitudinal axis in the second direction; and
    a support that is slidable up and down the column for supporting the at least one solenoid actuator.

6. The remote-control actuator according to claim 5, wherein the at least one solenoid actuator comprises two solenoid actuators supported on the support on opposing sides of the column, the two plungers thereof fixedly attached to end portions of the block.

7. The remote-control actuator according to claim 6, wherein the at least one button actuation system comprises two button actuation system located side-by-side in the housing.

8. The remote-control actuator according to claim 7, wherein each sidewall of the housing has an opening to allow access from outside of the housing for manually moving the support of each button actuation system up and down a respective column thereof.

9. The remote-control actuator according to claim 1, further comprising a tray receiving portion for receiving a tray on which the remote-control is supported, the tray receiving portion being able to receive the tray in a plurality of positions to cater to remote control of different designs and dimensions so that a button thereon remains at least substantially a predetermined distance from the pin to be thereby actuatable.

10. The remote-control actuator according to claim 9, wherein the tray receiving portion comprises spaced apart projections on each side wall defining a plurality of channels in the second direction for receiving the tray vertically with respect to the floor.

11. The remote-control actuator according to claim 10, wherein spaced apart projections on each side wall further defines a plurality of channels in the first direction for receiving the tray horizontally with respect to the floor.

12. The remote-control actuator according to claim 11, further comprising a bi-fold cover having a first cover panel hinged to a second cover panel, the first cover panel for covering a top opening defined in the housing for accessing the tray receiving portion and the second cover panel for covering a side opening defined in the housing for accessing the tray receiving portion, the side opening adjoining the top opening.

13. The remote-control actuator according to claim 12, further comprising:
    a lock fixedly mounted to the second cover panel, the lock having an engagement receiver;

an engagement member pivotably coupled to the floor of the housing, the engagement member being receivable in the engagement receiver.

14. The remote-control actuator according to claim 1, wherein the at least one data signal comprises a wireless data signal.

15. The remote-control actuator according to claim 14, wherein the wireless data signal is one of a Bluetooth, a Bluetooth Low Energy (BLE), a Zigbee, a Wi-fi, and a Short Messaging Service (SMS) data signal.

16. The remote-control actuator according to claim 1, further comprising:
   a receiving chamber defined in the housing for receiving a battery pack for powering the at least one solenoid actuator; and
   an ejector that engages a battery pack received in the receiving chamber; the ejector being actuatable to eject the battery pack from the receiving chamber.

\* \* \* \* \*